United States Patent
Nyvad et al.

(10) Patent No.: US 10,018,188 B2
(45) Date of Patent: Jul. 10, 2018

(54) WIND TURBINE WITH A TOWER-MOUNTED HEAT EXCHANGE STRUCTURE

(71) Applicant: Vestas Wind Systems A/S, Aarhus N. (DK)

(72) Inventors: Jesper Nyvad, Egå (DK); Thue Søndergård Thomsen, Århus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/310,256

(22) PCT Filed: Jun. 16, 2015

(86) PCT No.: PCT/DK2015/050170
§ 371 (c)(1),
(2) Date: Nov. 10, 2016

(87) PCT Pub. No.: WO2016/000715
PCT Pub. Date: Jan. 7, 2016

(65) Prior Publication Data
US 2017/0175716 A1    Jun. 22, 2017

(30) Foreign Application Priority Data

Jul. 2, 2014 (DK) .................. 2014 70411

(51) Int. Cl.
*F24H 3/00* (2006.01)
*F03D 80/60* (2016.01)
(Continued)

(52) U.S. Cl.
CPC ........... *F03D 80/60* (2016.05); *F28D 1/0443* (2013.01); *F28F 9/013* (2013.01); *F28G 1/166* (2013.01);
(Continued)

(58) Field of Classification Search
CPC .......... F03D 3/005; F03D 3/00; F03D 3/0454; F03D 80/60; F28D 1/0443;
(Continued)

(56) References Cited

U.S. PATENT DOCUMENTS 7,168,251 B1    1/2007    Janssen
7,172,386 B2 *  2/2007    Truong ................. F03D 3/0454
                                            290/55
(Continued)

FOREIGN PATENT DOCUMENTS

DE    102011107013 A1    1/2013
EP         2453451 A2    5/2012
(Continued)

OTHER PUBLICATIONS

Danish Patent and Trademark Office, Search Report in PA 2014 70411, dated Jan. 21, 2015.
(Continued)

*Primary Examiner* — Davis Hwu
(74) *Attorney, Agent, or Firm* — Wood Herron & Evans LLP

(57) ABSTRACT

A wind turbine with a tower; a nacelle supported by said tower; at least one unit to be cooled and arranged in the tower or the nacelle; a tower mounted heat exchange structure arranged outside the nacelle and tower; and a circuit facilitating a flow of a fluid medium between the at least one unit and the heat exchange structure. To improve thermal convection with the ambient space, the heat exchange structure comprises a set of panels mutually angled and extending outwards from the tower such that a flow of ambient air can pass transversely trough the panels and thereby cool the unit.

17 Claims, 2 Drawing Sheets

(51) Int. Cl.
*F28D 1/04* (2006.01)
*F28F 9/013* (2006.01)
*F28G 1/16* (2006.01)
*F28D 1/02* (2006.01)

(52) U.S. Cl.
CPC ... *F05B 2240/912* (2013.01); *F05B 2250/314* (2013.01); *F05B 2260/20* (2013.01); *F28D 2001/0266* (2013.01); *F28F 2275/22* (2013.01); *F28F 2280/105* (2013.01); *Y02E 10/72* (2013.01)

(58) Field of Classification Search
CPC ........ F28D 2001/0266; F05B 2240/912; F05B 2250/314; F28F 9/013; F28F 2275/22; F28G 1/66
USPC .......................................................... 165/47
See application file for complete search history.

(56) References Cited

U.S. PATENT DOCUMENTS

| | | | |
|---|---|---|---|
| 7,453,167 B2 * | 11/2008 | Gilbert | F03D 3/005 |
| | | | 290/55 |
| 7,964,981 B2 * | 6/2011 | Tsao | F03D 3/00 |
| | | | 290/44 |
| 2008/0124212 A1 | 5/2008 | Wobben | |

FOREIGN PATENT DOCUMENTS

| | | |
|---|---|---|
| WO | 2013007342 A1 | 1/2013 |
| WO | 2013185767 A1 | 12/2013 |

OTHER PUBLICATIONS

European Patent Office, International Search Report and Written Opinion in PCT Application No. PCT/DK2015/050170, dated Aug. 19, 2015.

* cited by examiner

WIND TURBINE WITH A TOWER-MOUNTED HEAT EXCHANGE STRUCTURE

INTRODUCTION

The invention relates to a wind turbine comprising a tower and a nacelle supported by said tower. The nacelle houses a rotor, and the tower and/or the nacelle includes at least one unit to be cooled. An exchange structure is arranged outside the nacelle and tower and a circuit provides a flow of a fluid medium between the unit and the exchange structure.

BACKGROUND OF THE INVENTION

A wind turbine typically comprises several units which generate excess heat. Examples of such components are gearboxes, transformers, bearings, generators, and power converters etc.

Such units are typically housed in a closed space within the tower or nacelle and heat exchange with the ambient space is limited. Often, active cooling, e.g. by use of a flow of air or a cooling liquid between the units and a heat exchanger, is necessary.

One commonly applied cooling structure for electrical components includes a fan for generating air flow around the electrical component or for generating air flow through a heat exchanger coupled to the component.

Particularly, very large wind turbines may include heat exchangers attached outside the nacelle, e.g. fixed to the roof of the nacelle. Since the nacelle is typically actively turned such that the rotor plane is always orientated into the wind, such roof-mounted heat exchangers also become orientated into the wind. The heat exchangers are therefore arranged side-by-side facing in one common direction, namely forward with respect to the nacelle and rotor plane.

U.S. Pat. No. 7,168,251 discloses a liquid cooled wind turbine with heat exchangers arranged outside the tower.

Since heat exchangers alongside of the tower, in contrast to the roof-mounted heat exchangers, are partly sheltered by the tower wall, such radiators typically lacks efficiency, and electrically powered fans must typically be applied for creating a forced flow of ambient air through the heat exchangers. This increases operation costs and makes the wind turbine more vulnerable.

SUMMARY OF THE INVENTION

It is an object of embodiments of the invention to facilitate a simpler, cheaper, and potentially more reliable way of establishing cooling in a wind turbine.

In a first aspect, the invention provides a wind turbine where a tower-mounted heat exchange structure comprises at least one set of generally planar shaped panels with a mutual angle therebetween of between 5° and 175° and wherein the panels are arranged in a V-shape extending out from the tower. The panels are made with an open structure such that a flow of ambient air can travel transversely trough the panel.

With the present invention a very effective cooling has been obtained by arranging the panels in V-shape extending out from the tower. Hereby a minimum combined area of the panels may be oriented into the wind regardless of the wind direction, and furthermore at least some free space on both the front side and back side of the individual panels for the wind to flow may be obtained. As such when positioning the panels in a suitable way externally on the tower, the panels can be cooled by air which naturally flows along the outer surface of the tower without the use of artificial, forced air streams, e.g. from a fan or similar powered ventilator means attached next to the panel.

In a second aspect, the invention provides a method of cooling a unit which is located in a tower or nacelle of a wind turbine, the method comprising the steps of conducting a flow of a fluid from the unit to a heat exchange structure comprising a set of panels located outside the tower and nacelle and cooling the set of panels by a natural flow of air along an outer surface of the tower without using an artificially forced stream of air, wherein said set of panels comprises at least a first panel and a second panel each having a generally planar shape and having a mutual angle therebetween of between 5° and 175°, said first panel and said second panel being arranged in a V-shape extending out from said tower.

DETAILED DESCRIPTION

In the following, embodiments of the invention will be described by way of example with reference to the figures in which.

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

When it is mentioned that the two panels extend in different directions with a mutual angle is herein meant that the surfaces of the panels are inclined relatively to each other such the surfaces are not flush with each other. The mutual angle is measured around the common center of rotation of the two panels, such that two panels positioned next to each other have a mutual angle of 180° and two panels above each other have a mutual angle of 0°.

Figure 1:
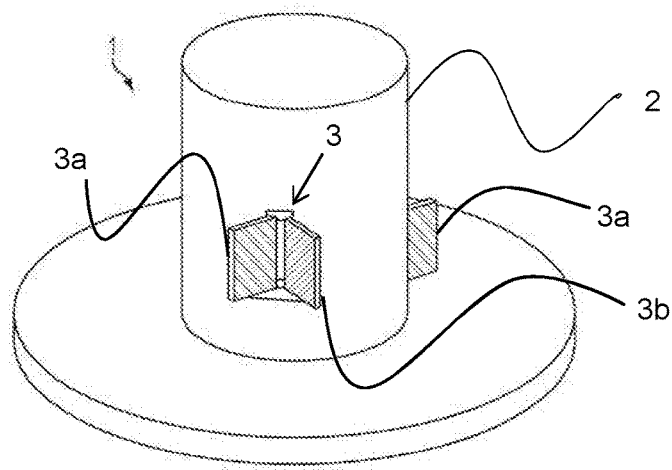
FIG. 1 illustrates, in perspective view, a section of a wind turbine according to an embodiment of the invention.

FIG. 1 illustrates a section of a wind turbine 1. The wind turbine comprises a tower 2 which carries a nacelle which is not shown in any of the Figs. The wind turbine further comprises a rotor (not shown) driven by wind and connected to an electrical generator for producing electricity by wind power.

Figure 2:
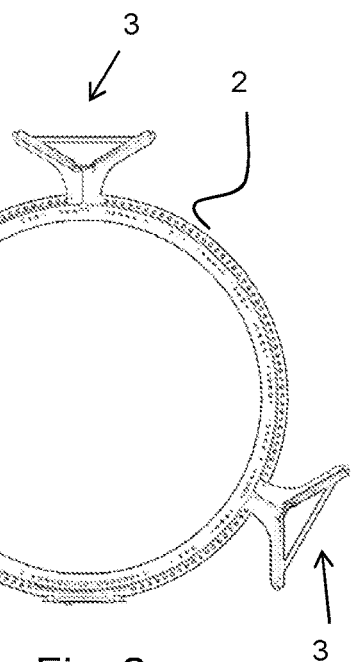
FIG. 2 illustrates, seen from above, a cross-section of the wind turbine of FIG. 1.

Located inside the tower, the wind turbine comprises different units needing cooling. Such units may i.a. be a converter and/or a transformer. These two electrical components are connected to a circuit providing a flow of a cooling fluid such that the thermal energy can be released to ambient space via sets 3 of panels 3a, 3b arranged outside the tower. One set of panels is seen on the front of the tower and part of another set can be seen on the right. This distribution can be seen in more detail on FIG. 2 illustrating the section of FIG. 1 seen from above.

In the illustrated embodiment, the tower is fitted with 3 sets of panels located at 120 degrees displaced relative to each other about the circular cross section of the tower. In this way, wind may blow directly through the open structure of at least some of the panels irrespective of the wind direction.

Figure 3:
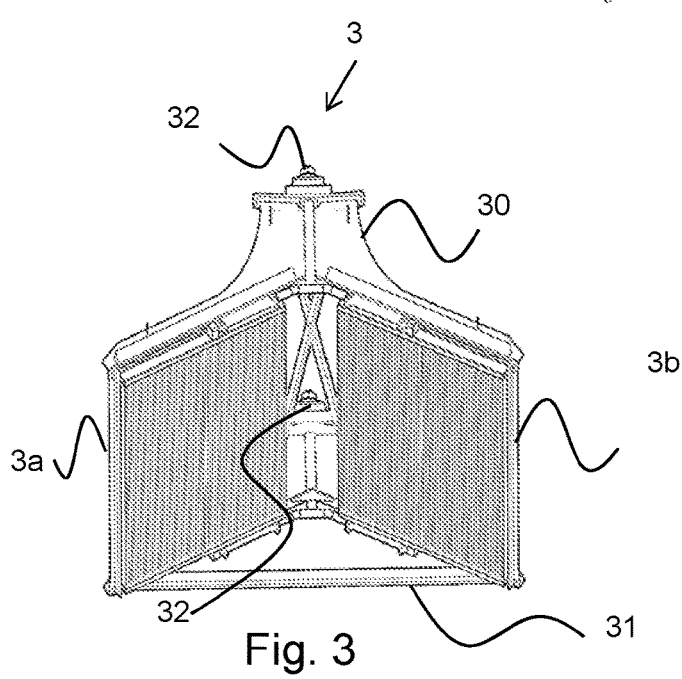
FIG. 3 illustrates a set of cooling panels according to an embodiment of the invention.

FIG. 3 illustrates a close-up view of a set 3 of panels. Each set includes a first panel 3a and a second panel 3b. Each of the panels form peripheral frames and have an open structure such that ambient air can flow transversely trough the panels.

The shown two panels 3a and 3b are generally planar shaped and extend in different planes with a V-shaped mutual angle. According to various embodiments of the present invention, this angle may be varied between 5° and 175° with a most preferred angle around 120° as shown in the figure. Compared to a single flat panel resulting from placing the two panels next to each other in the same plane (corresponding to an angle of 180°), a combined mutually angled below 180° two-panel provides a number of advantages. As the wind direction will change, it is important to always have at least a minimum surface area of the panels in the direction of the wind. For this reason, it is relevant to position the two panels in different angles, below 180°. At the same time, if the angle is too little, such that the two panels are more or less on top of each other (corresponding to angles approaching 0°), the same wind will to at least some degree pass through both panels, thereby not providing an ideal cooling effect. The most optimal results have been found to be present with a mutual angle around 120°.

Further the set of panels include a fixation structure 30, and a supporting beam 31 assisting in supporting the two panels relative to each other. Further in FIG. 3 can be seen that the fixation structure 30 includes attachment members 32 for mounting the set of panels to the wind turbine tower. In the illustrated embodiment, each fixation structure comprises two attachment members, each of which requires a hole in the tower. In other embodiments at least one of these attachment members could be a magnet. An advantage with the present invention is that the number of holes being made in the tower structure may be limited to avoid weakening of the tower structure. When mounting the panels in sets, only one or two holes may be required for mounting a set of panels, thereby creating a huge advantage as compared to prior art.

Since the panels are not flush with the tower surface, instead being oriented to some degree outwardly from the tower, wind can blow through the open structure without use of powered fans or other means for creating a forced air stream, and since the panels extend in different directions, any wind direction will at least create a flow of air through some of the panels.

The vertical positioning of the set of panels on the tower can be either below or behind the rotor plane, in other words behind or below the region of the tower being passed by the blades during operation of the turbine. Both positions have respective advantages.

Figure 4:
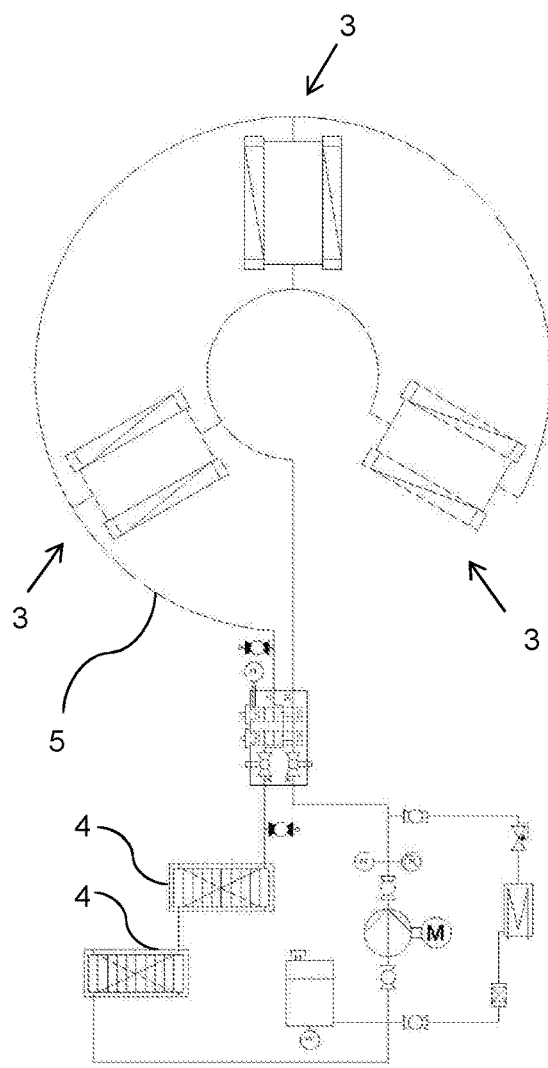
FIG. 4 illustrates a diagram of a cooling system for a wind turbine according to an embodiment of the invention.

FIG. 4 illustrates in a diagram the connection of the sets of panels and the transformer and converter including peripheral equipment such as accumulator tank, pumps etc. The system forms a circuit facilitating flow of a fluid medium between the heat generating units 4 and the sets of panels 3 (four indicated here) via the flow pipe-system 5. The heat generating units 4 are located inside the tower.

Figure 5:
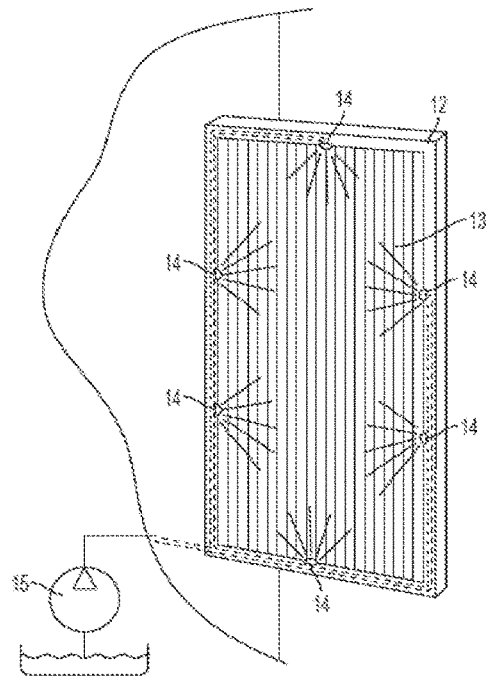
FIG. 5 illustrates details of a panel including nozzles for distributing a cleaning fluid according to an embodiment of the invention.

FIG. 5 illustrates one panel 3a/3b with further details in an embodiment where the panel comprises a cleaning system. The panel forms a rigid edge 12 and an open structure 13 centrally within the edge. The open structure allows flow of air transversely through the panel. The open structure may comprise flow passages for the fluid medium. To maintain good flow properties over time, it may be necessary to clean the panel, and particularly, to clean the open structure. For this purpose, the wind turbine comprises a cleaning system with nozzles 14 arranged to distribute a cleaning fluid over the open structure. The cleaning fluid may be fresh water or a particular detergent for dissolving insects, salt and other contaminants. The nozzles may particularly be fixed to the edge 12, and they could be adapted for high pressure provided by a pump 15, e.g. housed in the tower. To save water, the panel may collect the used cleaning fluid at the bottom of the panel.

Each panel may comprise an inlet and an outlet for the fluid medium, where the panel extends in parallel between the inlets and outlets. Further, each panel may have an edge with a proximal portion facing towards the tower and a distal portion facing away from the tower, the inlet and outlet being arranged in the edge.

Herein, "panel" means a heat exchanger for exchanging thermal energy between a fluid medium and ambient air and having a primarily two-dimensional shape, i.e. the panel has a largest dimension which is much larger than a corresponding smallest dimension. If the panel is square or rectangular, at least one of the length and height of the panel is much larger than the thickness of the panel. Herein, we refer to the "edge" of the panel as that side of the panel having the smallest dimension, and the "surface" of the panel is bounded by the other, larger, dimensions of the panel.

It should be pointed out that preferably the plane defined by the panel is oriented substantially in parallel with a vertical, longitudinal axis of the tower. Thus, preferably the plane of the panel has a substantially vertical orientation.

As an example, the largest dimension of the panel could be at least 5 times, such as 10-100 times larger than the smallest dimension.

The panel may have a structure corresponding to that of a traditional radiator well known in the art for heating or cooling purposes. Particularly, the panel may form an open structure, e.g. formed by a plurality of conduits for the fluid medium.

Since the panel is located outside of the tower, it may come in direct contact with seawater. Anti-corrosive characteristics may therefore be desired. The panels may therefore be partly or completely made from a non-metallic material, e.g. from a composite material or from a metal material coated with a sealing or anti-corrosive coating.

To provide efficient cooling regardless of the wind direction, the wind turbine according to the invention may comprise at least two, and preferably at least three sets of panels in different positions around the tower, e.g. equally spaced about the tower. If three panels are used, they could be located with 120 degrees spacing around the tower.

Each panel may comprise an inlet and an outlet for the fluid medium, and the panels may extend in parallel between the inlets and outlets. The inlet and outlet may be located in the edge of the panel, e.g. in that portion of the edge facing towards the tower.

In each panel, a passage structure may guide the fluid medium to establish spreading of the thermal energy over the surface of the panel. Particularly, the fluid medium may be guided in the panel in a direction from the tower and outwards, away from the tower.

At least one of the panels may have a width of at least one twentieth of a tower diameter, or even one tenth of a tower diameter.

The set of panels may be fixed to a common frame, e.g. in the shape of a flange extending circumferentially about the tower. The frame could be movable along the tower, or it may be rotatable about the tower until a desired position of the frame, and thus a desired position of the panels relative to the tower, is obtained. The frame may include attachment means for locking the position and thereby obtaining a rigid attachment of the frame to the tower. In this embodiment, the required number of holes needed in the tower wall for fastening may be even further decreased.

To obtain a short distance between a heat generating unit inside the tower and the panels, at least one set of panels could be located directly outside the tower at a specific height of a unit such that the fluid medium should essentially flow in a horizontal plane or at least primarily flow in a horizontal plane.

At least one of the set of panels could be fixed to the tower by a hinge joint allowing rotation relative to the tower. The set of panels may thereby be moved to an orientation by which good flow properties through the panels can be obtained. The set of panels may include power means for moving the set of panels relative to the tower, and the power means may be controlled automatically, e.g. based on wind direction, temperatures measured at different locations around the tower, solar incident angle etc.

The individual panels in at least one set of panels could be expandable in size. In this way, the capacity of the panel can be adjusted depending on the need for cooling and/or depending on the natural flow of air through the set of panels. The panel may include adjustment means for expanding the panel, and the adjustment means may be controlled automatically, e.g. based on wind direction, temperatures measured at different locations around the tower, solar incident angle etc.

An accumulator tank may be provided inside the tower to form buffer storage for the fluid medium. The accumulator tank may be located vertically above the panels to increase the pressure of the fluid medium in the panels.

To maintain a good convection and flow of air through the panels, the wind turbine may comprise at least one nozzle which is arranged such that it can distribute a cleaning fluid over the at least one panel. The wind turbine may e.g. comprise a row of nozzles for each panel, e.g. nozzles which are arranged adjacently or directly above the panel. The nozzles may be fed with a cleaning fluid from a pressure system such that the nozzles function as water high-pressure cleaners.

The cleaning fluid may be water, e.g. sea water pumped from the base of an offshore wind turbine, or it may be rainwater collected in the vicinity of the wind turbine, or it may be fluid of any kind stored in a storage tank in or at the wind turbine.

The invention claimed is:

1. A wind turbine comprising:
   a tower;
   a nacelle supported by said tower;
   a rotor supported by said nacelle;
   at least one unit to be cooled and arranged in the tower or the nacelle;
   a tower-mounted heat exchange structure arranged outside the nacelle and tower; and
   a circuit facilitating flow of a fluid medium between the at least one unit and the heat exchange structure, wherein the heat exchange structure comprises at least one set of panels, said set of panels comprising at least a first panel and a second panel each having a generally planar shape and having a mutual angle therebetween of between 5° and 175°, said first panel and said second panel being arranged in a V-shape extending out from said tower.

2. The wind turbine according to claim 1, wherein said first panel and said second panel extend in different planes with a mutual angle therebetween of between 40° and 16°.

3. The wind turbine according to claim 1, wherein said first panel and said second panel extend in different planes with a mutual angle therebetween of about 120°.

4. The wind turbine according to claim 1, wherein said first panel and said second panel are mounted on the same fixation structure.

5. The wind turbine according to claim 1, wherein said first panel and said second panel are mounted proximate each other on the same fixation structure with a distance between these of less than half the width of one of said first and second panels.

6. The wind turbine according to claim 1, wherein the first panel and the second panel have an open structure allowing a flow of air transversely through the panel whereby the panel can be cooled by an air flow along the tower.

7. The wind turbine according to claim 4, wherein said fixation structure comprises at least one attachment member for passing through a hole in a wall of said tower for fixating said set of panels to said tower.

8. The wind turbine according to claim 4, wherein said fixation structure is adapted for fixing at least two panels to said tower by the use of two holes or fewer in a wall of said tower.

9. The wind turbine according to claim 4, wherein said fixation structure comprises a magnet for assisting in fixating said set of panels to said tower.

10. The wind turbine according to claim 1, wherein the heat exchange structure comprises at least three sets of panels distributed substantially equally spaced circumferentially around the tower.

11. The wind turbine according to claim 1, where at least one set of panels and the unit are located at generally the same vertical height.

12. The wind turbine according to claim 1, where at least one set of panels is joined to the tower by a hinge allowing rotation of the set of panels relative to the tower.

13. The wind turbine according to claim 1, comprising an accumulator tank for the fluid medium, the accumulator tank being located in the tower.

14. The wind turbine according to claim 1, comprising at least one nozzle for distributing a cleaning fluid over the at least one set of panels.

15. A method of cooling a unit which is located in a tower or nacelle of a wind turbine, the method comprising the steps of conducting a flow of a fluid from the unit to a heat exchange structure comprising a set of panels located outside the tower and nacelle and cooling the set of panels by a natural flow of air along an outer surface of the tower without using an artificially forced stream of air, wherein said set of panels comprises at least a first panel and a second panel each having a generally planar shape and having a mutual angle therebetween of between 5° and 175°, said first panel and said second panel being arranged in a V-shape extending out from said tower.

16. A wind turbine comprising:
a tower;
a nacelle supported by said tower;
a rotor supported by said nacelle;
at least one unit to be cooled and arranged in the tower;
a tower-mounted heat exchange structure arranged outside the nacelle and tower; and
a circuit facilitating flow of a fluid medium between the at least one unit and the heat exchange structure,
wherein the heat exchange structure comprises at least one set of panels, said set of panels comprising at least a first panel and a second panel each having a generally planar shape and having a mutual angle therebetween of between 5° and 175°, said first panel and said second panel being arranged in a V-shape extending out from said tower.

17. The wind turbine according to claim 1, wherein the heat exchange structure is configured to be exposed to a flow of ambient air so as to exchange heat with the fluid medium in the circuit.

\* \* \* \* \*